United States Patent
Kang

(10) Patent No.: US 12,218,331 B2
(45) Date of Patent: Feb. 4, 2025

(54) BATTERY MODULE AND BATTERY PACK INCLUDING THE SAME

(71) Applicant: LG ENERGY SOLUTION, LTD., Seoul (KR)

(72) Inventor: Tae Young Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1022 days.

(21) Appl. No.: 17/263,764

(22) PCT Filed: Jun. 26, 2020

(86) PCT No.: PCT/KR2020/008381
§ 371 (c)(1),
(2) Date: Jan. 27, 2021

(87) PCT Pub. No.: WO2021/080115
PCT Pub. Date: Apr. 29, 2021

(65) Prior Publication Data
US 2021/0376410 A1 Dec. 2, 2021

(30) Foreign Application Priority Data
Oct. 24, 2019 (KR) .................. 10-2019-0133055

(51) Int. Cl.
*H01M 10/6567* (2014.01)
*H01M 10/613* (2014.01)
(Continued)

(52) U.S. Cl.
CPC ..... *H01M 10/6567* (2015.04); *H01M 10/613* (2015.04); *H01M 10/625* (2015.04);
(Continued)

(58) Field of Classification Search
CPC ........... H01M 10/6567; H01M 10/613; H01M 10/625; H01M 50/209; H01M 50/211;
(Continued)

(56) References Cited

U.S. PATENT DOCUMENTS 10,497,910 B2 12/2019 Lee et al.
10,770,765 B2 9/2020 Yoon et al.
(Continued)

FOREIGN PATENT DOCUMENTS

CN 101542824 A 9/2009
CN 102054946 A 5/2011
(Continued)

OTHER PUBLICATIONS

Search Report dated Aug. 21, 2023 from the Office Action for Chinese Application No. 202080004168.3 issued Aug. 23, 2023, pp. 1-3. [See pp. 1-2, categorizing the cited references].
(Continued)

*Primary Examiner* — Adam A Arciero
(74) *Attorney, Agent, or Firm* — Lerner David LLP

(57) ABSTRACT

A battery module cooled by insulating oil, and a battery pack including the same include a battery cell stack, in which a plurality of battery cells are stacked; electrode leads formed so as to protrude from the battery cells; a frame covering the upper, lower, left, and right surfaces of the battery cell stack; and end plates covering front and rear surfaces of the battery cell stack. Each of the battery cells have edge surfaces and flat surfaces. Space parts are defined between the edge surfaces and the frame and between the edge surfaces and the end plates; Insulating oil for cooling the plurality of battery cells is filled and flows in the space parts, and the insulating oil makes contact with the battery cells and the electrode leads.

10 Claims, 9 Drawing Sheets

(51) Int. Cl.
  *H01M 10/625* (2014.01)
  *H01M 50/209* (2021.01)
  *H01M 50/211* (2021.01)
  *H01M 50/533* (2021.01)

(52) U.S. Cl.
  CPC ....... *H01M 50/209* (2021.01); *H01M 50/211* (2021.01); *H01M 50/533* (2021.01); *H01M 2220/20* (2013.01)

(58) Field of Classification Search
  CPC ........... H01M 50/533; H01M 2220/20; H01M 50/507; H01M 50/20; H01M 10/6553; H01M 50/531; Y02E 60/10; Y02T 10/70
  USPC ........................................................ 429/120
  See application file for complete search history.

(56) References Cited

U.S. PATENT DOCUMENTS

| | | | |
|---|---|---|---|
| 2009/0253028 A1 | 10/2009 | Takagi | |
| 2010/0276120 A1 | 11/2010 | Takagi | |
| 2011/0104547 A1 | 5/2011 | Saito et al. | |
| 2014/0242429 A1 | 8/2014 | Lee et al. | |
| 2014/0342195 A1* | 11/2014 | Bhola | H01M 10/613 429/50 |
| 2016/0233465 A1 | 8/2016 | Lee et al. | |
| 2018/0090799 A1 | 3/2018 | Yoon et al. | |
| 2018/0205124 A1 | 7/2018 | Lee et al. | |
| 2018/0316070 A1 | 11/2018 | Lee et al. | |
| 2019/0245175 A1 | 8/2019 | Qin et al. | |
| 2019/0334217 A1 | 10/2019 | Yoon et al. | |
| 2020/0127257 A1* | 4/2020 | Lee | H01M 50/289 |
| 2020/0168864 A1 | 5/2020 | Seo et al. | |

FOREIGN PATENT DOCUMENTS

| | | | |
|---|---|---|---|
| CN | 107925029 | A | 4/2018 |
| CN | 108292791 | A | 7/2018 |
| CN | 108432034 | A | 8/2018 |
| CN | 207800740 | U | 8/2018 |
| EP | 3660975 | A1 | 6/2020 |
| JP | S56005372 | U | 1/1981 |
| JP | 2003346924 | A | 12/2003 |
| JP | 2008204764 | A | 9/2008 |
| JP | 2009170369 | A | 7/2009 |
| JP | 2013051100 | A | 3/2013 |
| JP | 5644086 | B2 | 12/2014 |
| JP | 2018538662 | A | 12/2018 |
| JP | 2019507469 | A | 3/2019 |
| JP | 2019140083 | A | 8/2019 |
| KR | 20130022107 | A | 3/2013 |
| KR | 20140039350 | A | 4/2014 |
| KR | 101431550 | B1 | 10/2014 |
| KR | 101447062 | B1 | 11/2014 |
| KR | 20160016499 | A | 2/2016 |
| KR | 20170084522 | A | 7/2017 |
| KR | 20170132514 | A | 12/2017 |
| KR | 20180016801 | A | 2/2018 |
| KR | 20180035174 | A | 4/2018 |
| KR | 20190066731 | A | 6/2019 |
| KR | 20190078841 | A | 7/2019 |

OTHER PUBLICATIONS

Extended European Search Report for Application No. 20841853.3, dated Sep. 2, 2021, 9 pages.
International Search Report for Application No. PCT/KR2020/008381, mailed Oct. 23, 2020, pp. 1-2.

* cited by examiner

[FIG. 1]
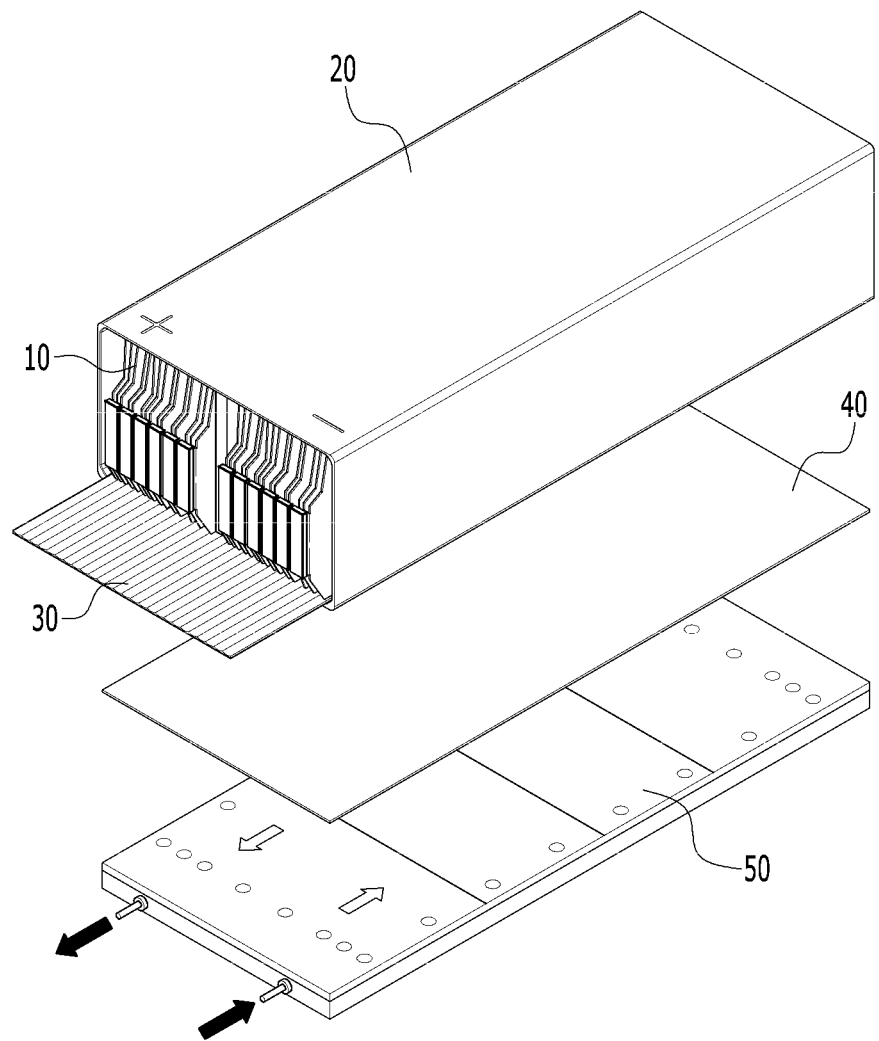

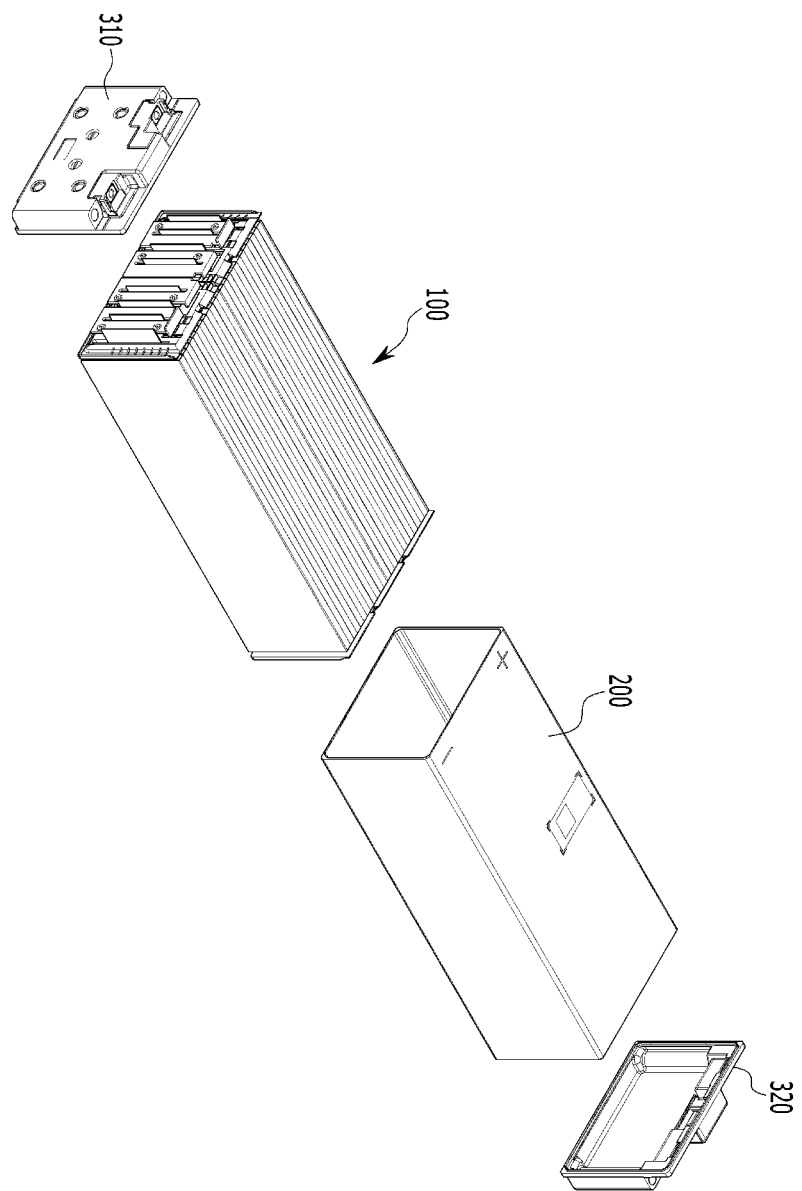
【FIG. 2】

[FIG. 3]
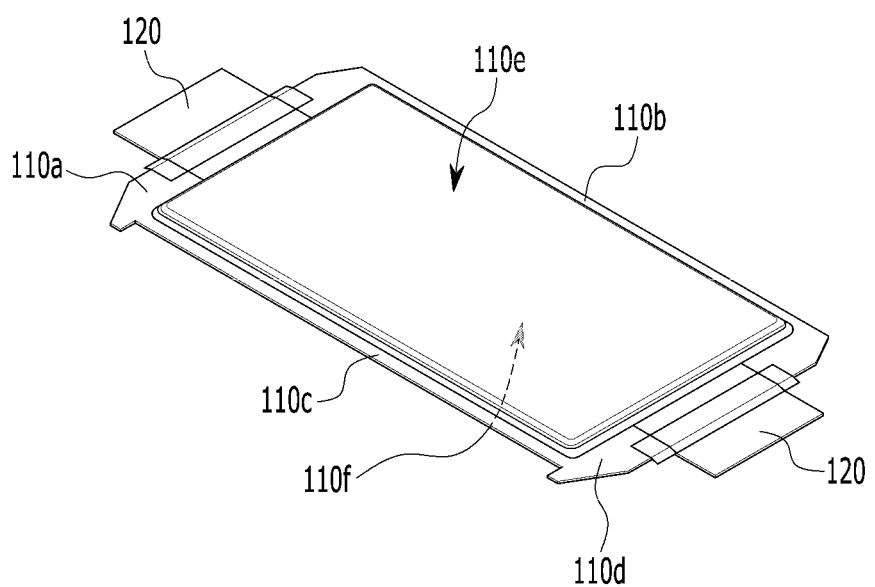

[FIG. 4]
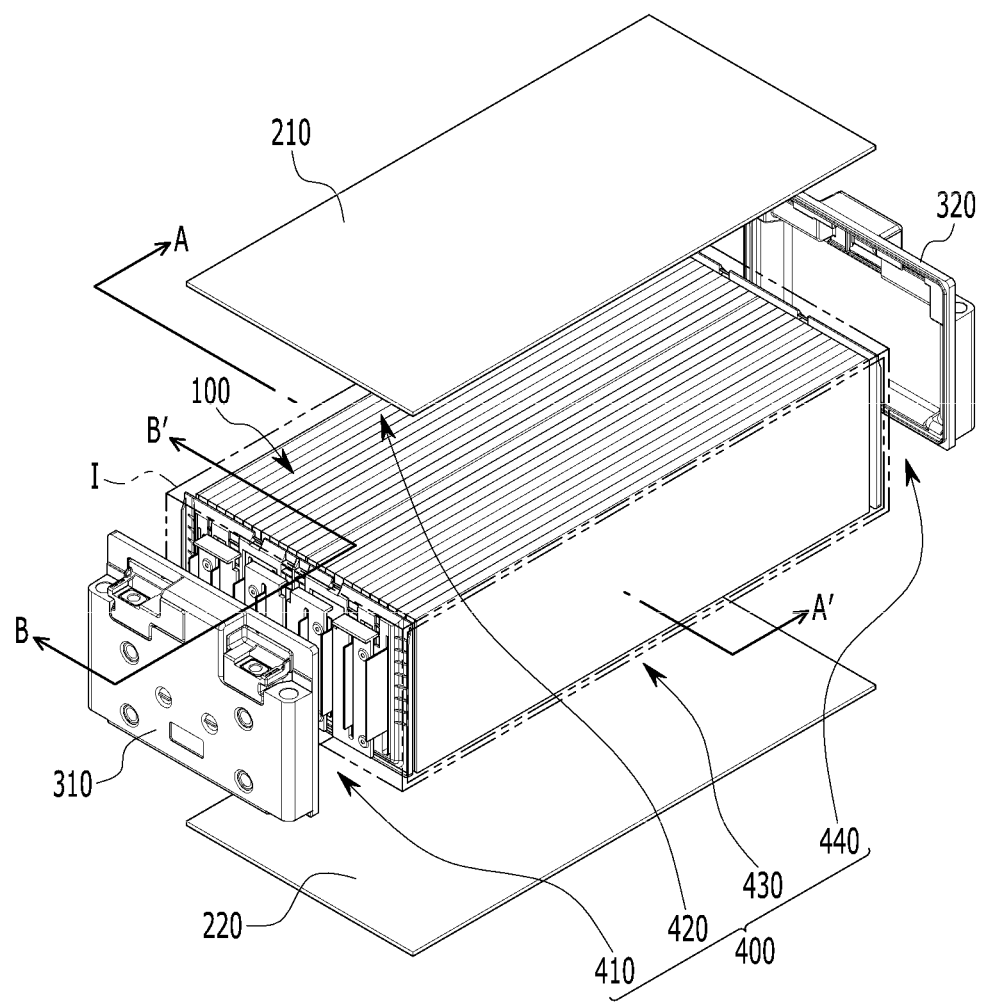

[FIG. 5]
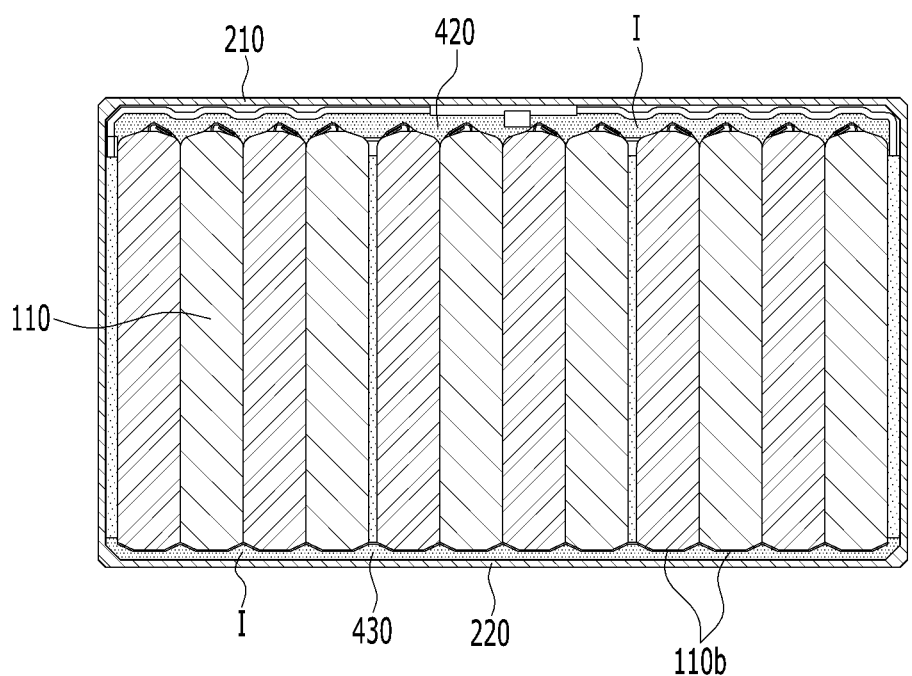

【FIG. 6】
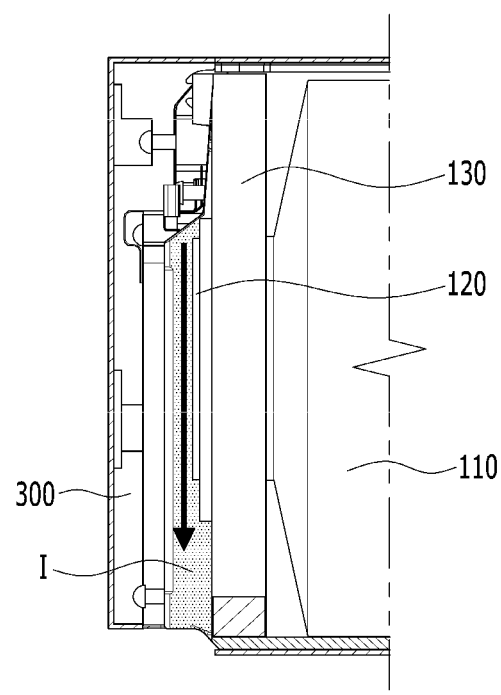

[FIG. 7]
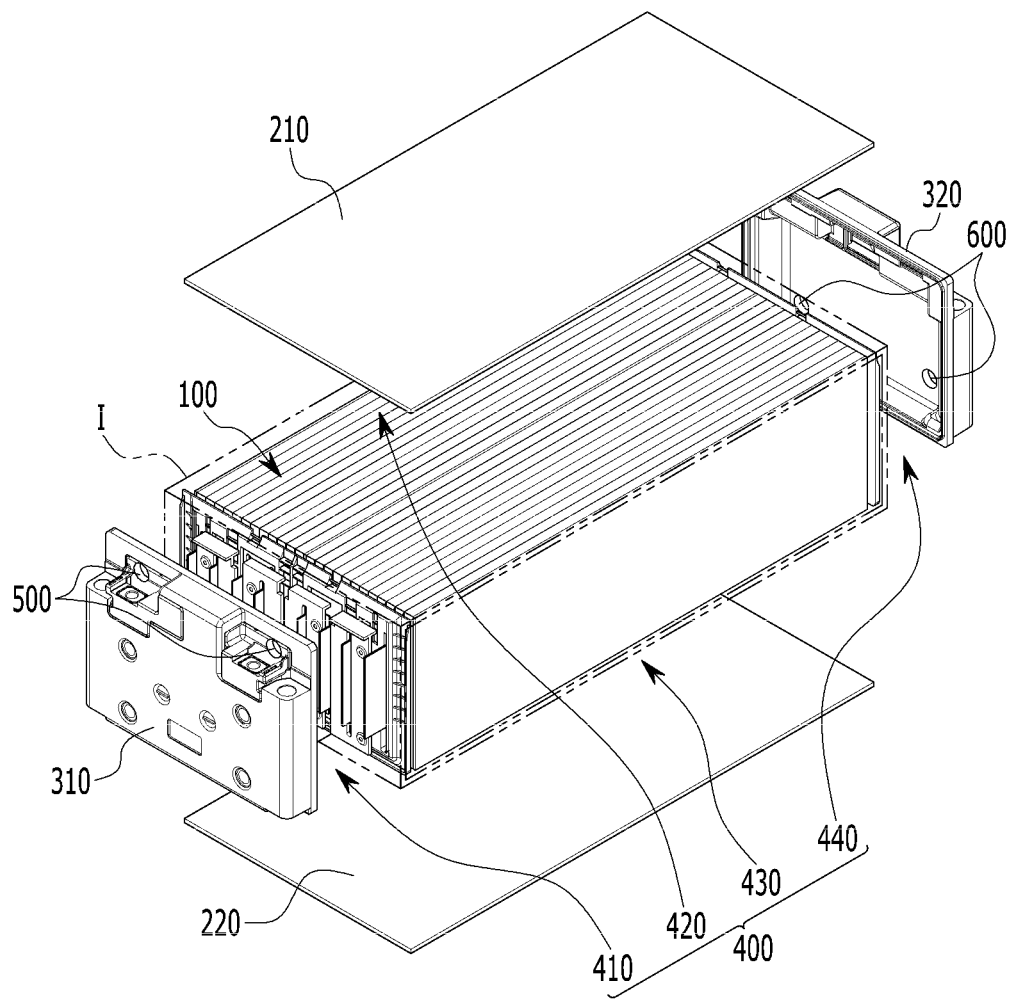

[FIG. 8]
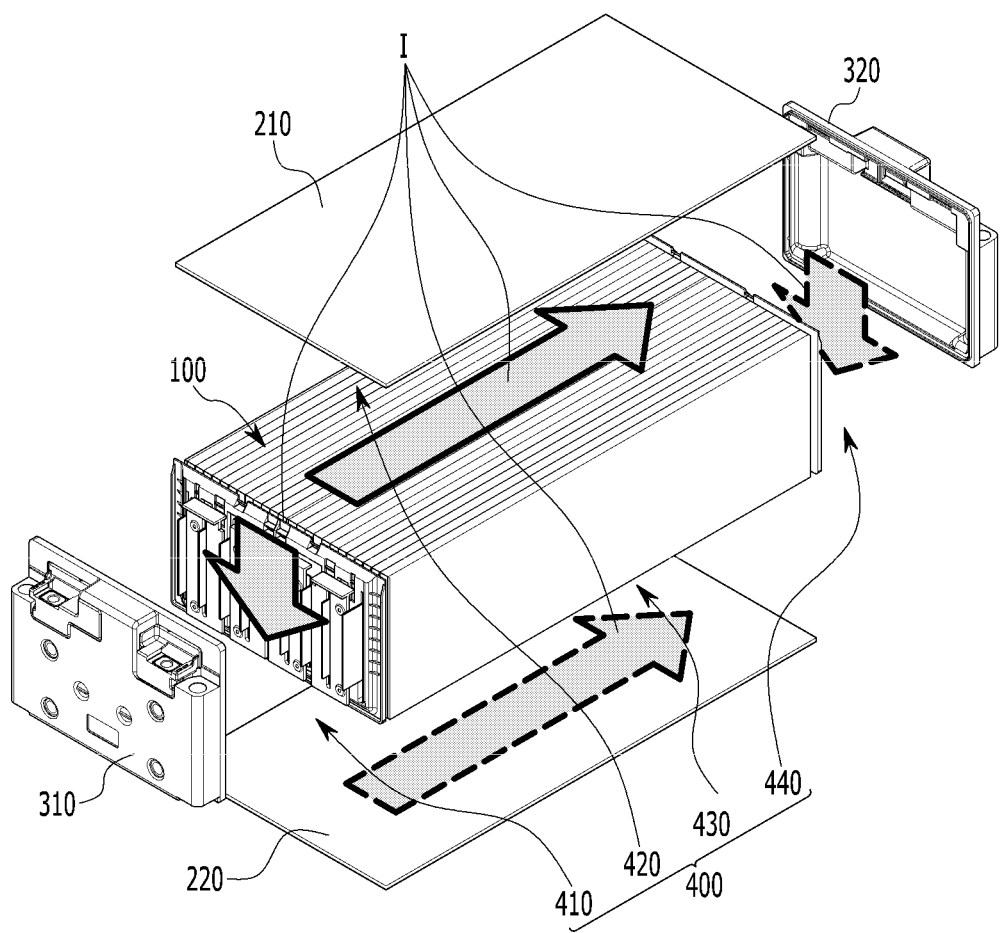

[FIG. 9]
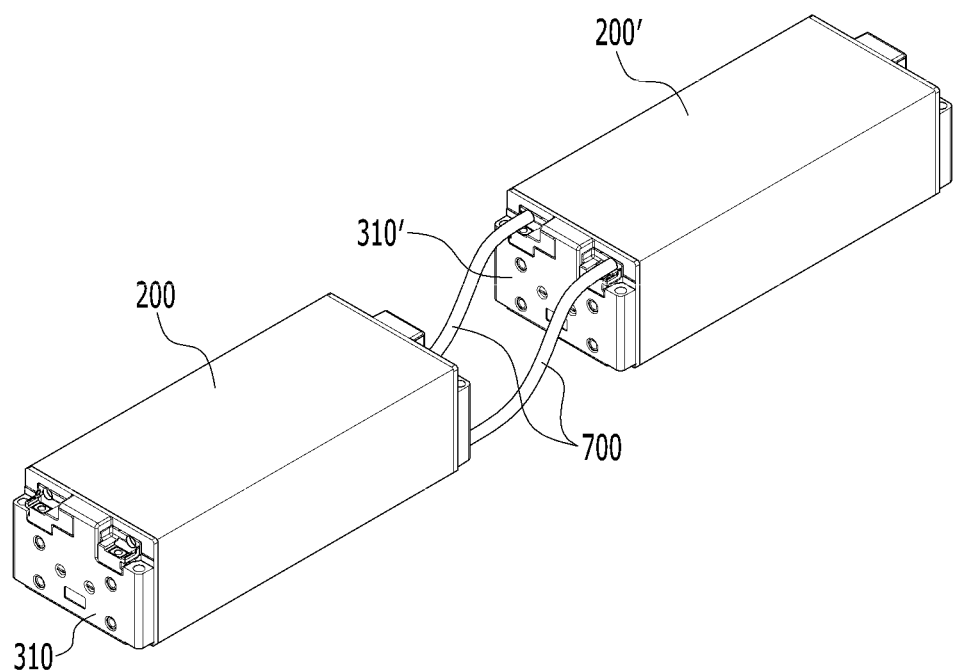

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/008381 filed Jun. 26, 2020, which claims priority from Korean Patent Application No. 10-2019-0133055 filed on Oct. 24, 2019, the disclosures of which are incorporated herein by reference in their entirety.

TECHNICAL FIELD

The present disclosure relates to a battery module and a battery pack including the same, and more particularly to a battery module utilizing an insulating oil, and a battery pack including the same.

BACKGROUND ART

Secondary batteries have attracted much attention as an energy source in various products such as a mobile device and an electric vehicle. The secondary battery is a potent energy resource that can replace the use of existing products using fossil fuels, and is in the spotlight as an environmentally-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

Such a battery module includes a battery cell stack in which a plurality of battery cells are stacked, electrode leads formed so as to protrude from the battery cells, a frame formed of the upper, lower, left, and right surfaces and covering the upper, lower, left, and right surfaces of the battery cell stack, and end plates covering front and rear surfaces of the battery cell stack.

It is important to use the lithium-ion battery module at a proper temperature because the deterioration of its lifespan at high temperature is accelerated. To achieve this, most of the lithium-ion battery modules are cooled by an air cooling system or a water cooling system, but the existing cooling structure employs a system for performing a cooling operation through interfaces of several steps. However, there is a problem that the interfaces increase thermal resistance and the components increase the weight of a vehicle.

Further, a positive electrode and a case of the battery module should always maintain insulation performance and, even if a high voltage is applied thereto, they should not be destroyed. However, there is a problem in that it is difficult to secure a sufficient insulation distance by only utilizing a layout design for reducing the weight and the volume of the battery module.

FIG. 1 is a perspective view illustrating a battery module of the related art.

According to the related art, a plurality of battery cells function to discharge heat generated by the plurality of battery cells through elements of a battery cell stack 10 (in which a plurality of battery cells are stacked and formed), a frame 20 accommodating the battery cell stack 10, a thermal resin 30 formed between a lower side of the battery cell stack 10 and a lower surface of the frame 20 to transfer heat, a thermal pad 40 located on a lower side of the thermal resin 30 to transfer heat, and a heat sink 50 located on a lower side of the thermal pad 40.

However, as described above, in a cooling system of the related art, which performs a cooling operation through elements of several steps, the weight of the battery module increases due to the addition of the elements, thermal resistance increases as several steps are performed, and it is difficult to secure the insulation distance between the positive electrode and the case of the battery module due to the concentration of the elements while reducing the volume of the battery module.

DETAILED DESCRIPTION OF THE INVENTION

Technical Problem

It is an object of the present disclosure to provide a battery module that reduces the weight and the thermal resistance thereof, and secures the insulation performance thereof, and a battery pack including the same.

However, the problem to be solved by embodiments of the present disclosure is not limited to the above-described problems, and can be variously expanded within the scope of the technical idea included in the present disclosure.

Technical Solution

A battery module according to an embodiment of the present disclosure may include a battery cell stack, in which battery cells each formed of edge surfaces and flat surfaces are stacked; electrode leads formed so as to protrude from the battery cells; a frame formed of upper, lower, left, and right surfaces and covering the upper, lower, left, and right surfaces of the battery cell stack; and end plates covering front and rear surfaces of the battery cell stack, wherein space parts are formed between the edge surfaces and the frame and between the edge surfaces and the end plates, and insulating oil for cooling the plurality of battery cells is filled and flows in the space parts, and the insulating oil makes contact with the battery cells and the electrode leads.

The space parts may include a first space part formed between the edge surfaces of the battery cells formed on a front surface of the battery cell stack, and a first end plate covering a front surface of the battery cell stack; a second space part formed between the edge surfaces of the battery cells formed on the upper side of the battery cell stack, and an upper surface of the frame; a third space part formed between the edge surfaces of the battery cells formed on the lower side of the battery cell stack, and a lower surface of the frame; and a fourth space part formed between the edge surfaces of the battery cells formed on a rear surface of the battery cell stack, and a second end plate covering a rear surface of the battery cell stack.

The first and fourth space parts may be formed in spaces between the edge surfaces formed in two adjacent battery cells, and the end plates.

The second and third space parts may be formed in spaces between the edge surfaces formed on two adjacent battery cells, and the frame.

The insulating oil may flow from the first space part to either the second space part or the third space part, and then to the fourth space part.

A supply part, to which the insulating oil is supplied, may be formed at an upper end of the first end plate, and a discharge part, from which the insulating oil is discharged, may be formed at a lower end of the second end plate.

The electrode leads may be formed so as to protrude from both ends of the battery cells to the first and fourth space parts, respectively, to make contact with the insulating oil flowing in the first and fourth space parts.

The end plates and the frame may be coupled to each other by an adhesive agent, and the end plates and the frame may be sealed through the adhesive agent.

The battery module may further include busbar frames formed between the end plates and the battery cell stack, and the busbar frames may be located on the space parts to make contact with the insulating oil.

Advantageous Effects

The battery module according to the embodiment of the present disclosure and the battery pack including the same reduce the thermal resistance and the weight thereof as the elements for cooling the battery cell of the related art are replaced by the insulating oil, and the battery cells and the insulating oil may directly contact each other, and accordingly cooling performance can be improved.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view illustrating a battery module of the related art;

FIG. 2 is an exploded perspective view illustrating a battery module according to an embodiment of the present disclosure;

FIG. 3 is a perspective view illustrating a battery cell according to the embodiment of the present disclosure;

FIG. 4 is an exploded perspective view illustrating locations of insulating oil according to the embodiment of the present disclosure;

FIG. 5 is a cross-section illustrating second and third space parts filled with the insulating oil at section A-A' of FIG. 4;

FIG. 6 is a cross-section illustrating first and fourth space parts filled with the insulating oil at section B-B' of FIG. 4;

FIG. 7 is an exploded perspective view illustrating a supply part and a discharge part according to the embodiment of the present disclosure;

FIG. 8 is an exploded perspective view illustrating flows of insulating oil according to the embodiment of the present disclosure; and FIG. 9 is a perspective view illustrating connection passages between the battery modules according to the embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated to scale, but rather parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, components or combinations thereof, but it should be understood that they do not preclude a possibility of existence or addition of one or more other features, numbers, steps, constitutional elements, components or combinations thereof.

Hereinafter, a battery module according to an embodiment of the present disclosure will be described with reference to FIGS. 2 to 6.

FIG. 2 is an exploded perspective view illustrating a battery module according to an embodiment of the present disclosure. FIG. 3 is a perspective view illustrating a battery cell according to the embodiment of the present disclosure. FIG. 4 is a view illustrating locations of insulating oil according to the embodiment of the present disclosure. FIG. 5 is a cross-section illustrating second and third space parts filled with the insulating oil at section A-A' of FIG. 4. FIG. 6 is a cross-section illustrating first and fourth space parts filled with the insulating oil at section B-B' of FIG. 4.

Referring to FIGS. 2 to 6, the battery module according to the embodiment of the present disclosure includes a battery cell stack 100, in which battery cells 110 each formed of edge surfaces 110a, 110b, 110c, and 110d and flat surfaces 110e and 110f are stacked, and electrode leads 120 are formed so as to protrude from the battery cells 110; a frame 200 formed of the upper, lower, left, and right surfaces cover the upper, lower, left, and right surfaces of the battery cell stack 100, respectively; end plates 300 cover front and rear surfaces of the battery cell stack 100; space parts 400 are formed between the edge surfaces and the frame 200 and between the edge surfaces and the end plates 300; and insulating oil I for cooling the plurality of battery cells 110 is filled and flows in the space parts 400, and the insulating oil I makes contact with the battery cells 110 and the electrode leads 120.

The battery cell 110 is a secondary battery, which may be configured of a pouch type secondary battery. The battery cells 110 may be formed of a plurality of battery cells, and the plurality of the battery cells 110 may be stacked to be electrically connected to each other, and thus the battery cell stack 100 may be formed. As illustrated in FIG. 3, each of the plurality of the battery cells 110 may include flat surfaces 110e and 110f forming a case; four directional edge surfaces 110a, 100b, 100c, and 100d formed so as to extend from peripheries of the flat surfaces to seal an electrode assembly in the interior of the case; and electrode leads 120 formed so as to protrude from the electrode assembly.

Busbar frames 130 may be formed between the end plates 300 and the battery cell stack 100 to cover the front and rear surfaces of the battery cell stack 100 and to electrically connect the electrode leads 120. The busbar frames 130 may be located in the first space part 410 and the fourth space part 440, of the space parts 400 which will be described below, to make contact with the insulating oil I flowing in the interior of the first and fourth space parts 410 and 440.

The frame 200 may accommodate the battery cell stack 100 on the upper, lower, left, and right surfaces of the battery cell stack 100. According to the embodiment of the present disclosure, the insulating oil I may be filled and flows in a second space part 420 formed between an upper surface 210 of the frame and an upper side part of the battery cell stack 100, and a third space part 430 formed between a lower surface 220 of the frame and a lower side part of the battery cell stack 100.

The end plates 300 may be formed so as to cover the front and rear surfaces of the battery cell stack 100 to physically protect the battery cell stack 100, the busbar frames 130, and electronic components connected thereto. Further, the end plates 310 may include a structure for mounting the battery module on a battery pack.

According to the embodiment of the present disclosure, the end plates 300 may be coupled to the frame 200 by an adhesive agent. The end plates 300 and the frame 200 are sealed so that the insulating oil I filled and flowing inside the end plates 300 and the frame 200 is not leaked to the outside of the battery module. Before the end plates 300 and the frame 200 are bonded to each other, portions of bonding parts of the end plates 300 and the frame 200 are locally welded to each other to fix the bonded locations of the elements.

The end plates 300 may include a first end plate 310 formed on a front surface of the battery cell stack 100, and a second end plate 320 formed on a rear surface of the battery cell stack.

The space parts 400 are formed between the edge surfaces 110*a*, 110*b*, 110*c*, and 110*d* of the battery cells 110 and the frame 200 and between the edge surfaces 110*a*, 110*b*, 110*c*, and 110*d* and the end plates 300, and the insulating oil I for cooling the plurality of battery cells 110 is filled and flows in the space parts 400, and the insulating oil I makes contact with the battery cells 110 and the electrode leads 120 to cool heat generated by the plurality of battery cells 110.

The space parts 400 may include: a first space part 410 formed between the edge surfaces 110*a* of the battery cells 110 formed on a front surface of the battery cell stack 100, and a first end plate 310 covering a front surface of the battery cell stack 100; a second space part 420 formed between the edge surfaces 110*b* of the battery cells 110 formed on the upper side of the battery cell stack 100, and an upper surface 210 of the frame 200; a third space part 430 formed between the edge surfaces 110*c* of the battery cells 110 formed on the lower side of the battery cell stack 100, and a lower surface 220 of the frame 200; and a fourth space part 440 formed between the edge surfaces 110*d* of the battery cells 110 formed on a rear surface of the battery cell stack 100, and a second end plate 320 covering a rear surface of the battery cell stack 100.

According to the embodiment of the present disclosure, the first and fourth space parts 410 and 440 may be formed in spaces between the edge surfaces 110*a* and 110*d* formed in two adjacent battery cells, and the end plates 300. In more detail, the first space part 410 may be formed in a space between the edge surfaces 110*a* formed in two adjacent battery cells, and the first end plate 310. The fourth space part 440 may be formed in a space between the edge surfaces 110*d* formed in two adjacent battery cells, and the second end plate 320.

The electrode leads 120 are disposed in the first and fourth space parts 410 and 440, respectively, so that the insulating oil I filled and flowing in the first and fourth space parts 410 and 440 may directly contact the electrode leads 120. Because the electrode leads 120 are the most heated parts of the battery cells 110, the electrode leads 120 and the insulating oil I may directly contact each other through the first and fourth space parts 410 and 440 to enhance the cooling performance of the entire battery module.

The second and third space parts 420 and 430 may be formed in spaces between the edge surfaces 110*b* and 110*c* formed in two adjacent battery cells, and the frame 200. In more detail, the second space part 420 may be formed in spaces between the edge surfaces 110*b* formed in two adjacent battery cells, and the upper surface 210 of the frame. The third space parts 430 may be formed in spaces between the edge surfaces 110*c* formed in two adjacent battery cells, and the lower surface 220 of the frame.

According to the embodiment of the present disclosure, because the space parts 410, 420, 430, and 440 are defined along the edge surfaces 110*a*, 110*b*, 110*c*, and 110*d* of the battery cells 110, and the insulating oil I is filled and flows in the space parts 410, 420, 430, and 440, as a result, cooling passages may be formed on the edge surfaces 110*a*, 110*b*, 110*c*, and 110*d* of the battery cells 110. Because the edge surfaces 110*a*, 110*b*, 110*c*, and 110*d* of the battery cells 110 are portions having a high thermal conductivity, the insulating oil I may flow while directly contacting the edge surfaces 110*a*, 110*b*, 110*c*, and 110*d* to enhance the cooling performance of the battery cells 110.

Further, according to the embodiment of the present disclosure, the insulation oil I does not contact the flat surfaces 110*e* and 110*f*, but rather contacts only the edge surfaces 110*a*, 110*b*, 110*c*, and 110*d* so that the insulating oil may directly contact and cool four surfaces of six surfaces of the battery cells 110 through the edge surfaces 110*a*, 110*b*, 110*c*, and 110*d*, which occupy only about 10% of the areas of the battery cells 110.

Further, elements of a thermal resin, a thermal pad, a heat sink, and the like according to the related art are not necessary any more due to the use of the insulating oil I so that the thermal resistances of the elements are reduced and the battery module may be light-weight and compact. Further, a danger of an air gap defect and the like between interfaces during the process of attaching the thermal resin and the thermal pad may be prevented in advance, and an internal short-circuit of the battery module due to leakage of cooling water may be also prevented in advance.

Hereinafter, flows of insulating oil through a supply part and a discharge part according to the embodiment of the present disclosure will be described with reference to FIGS. 7 to 9.

FIG. 7 is a view illustrating a supply part and a discharge part according to the embodiment of the present disclosure. FIG. 8 is a view illustrating flows of insulating oil according to the embodiment of the present disclosure. FIG. 9 is a view illustrating connection passages between the battery modules according to the embodiment of the present disclosure.

Referring to FIGS. 7 and 8, the supply part 500, to which the insulating oil I is supplied, may be formed at an upper end of the first end plate 310, and the discharge part 600, from which the insulating oil I is discharged, may be formed at a lower end of the second end plate 320. Accordingly, the insulating oil supplied to the supply part 500 may flow from the first space part 410 to the second space part 420 or the third space part 430 and then to the fourth space part 440. The insulating oil I flowing to the fourth space part 440 may be discharged to the outside of the battery module through the discharge part 600.

The supply part 500 and the discharge part 600 may be connected to each other through the connection passage 700. According to the embodiment of the present disclosure, the connection passage 700 may be formed of a hose, but the present disclosure is not limited thereto, and any connection passage of a material, by which the passage resistance of the insulating oil I can be minimized to stably supply the insulating oil I is sufficient.

According to the embodiment of the present disclosure, the supply part 500 may be formed at the upper end of the first end plate 310, and the discharge part 600 may be formed at the lower end of the second end plate 320. In this way, the supply part 500 is located on the upper side of the discharge part 600 so that the insulating oil I can be stably supplied to the battery modules in consideration of a difference between the passage resistance of passage of the interior of the battery module and the resistance of the connection passage 700, which connects the battery modules.

The battery module as described above may be included in a battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell stack
110: battery cell
110a, 110b, 110c, 110d: edge surfaces
110e, 110f: flat surfaces
120: electrode lead
130: busbar frame
200: frame
210: upper surface
220: lower surface of frame
300: end plate
310: first end plate
320: second end plate
400: space part
410: first space part
420: second space part
430: third space part
440: fourth space part
500: supply part
600: discharge part
700: connection passage
I: insulating oil

The invention claimed is:

1. A battery module comprising:
    a battery cell stack in which a plurality of battery cells are stacked, each of the plurality of battery cells having edge surfaces;
    a plurality of electrode leads protruding from the respective plurality of battery cells;
    a frame covering an upper surface, a lower surface, a left surface, and a right surface of the battery cell stack; and
    end plates covering a front surface and a rear surface of the battery cell stack;
    wherein a plurality of space parts are defined between the edge surfaces and the frame and between the edge surfaces and the end plates,
    wherein insulating oil for cooling the plurality of battery cells is positioned to flow in the plurality of space parts, such that the insulating oil makes direct contact with the battery cells and the electrode leads, and
    wherein the insulating oil is supplied to the battery module via a supply inlet and is discharged from the battery module via a discharge outlet.

2. The battery module of claim 1, wherein the plurality of space parts comprise:
    a first space part defined between a first one of the end plates and the edge surfaces of the battery cells positioned along the front surface of the battery cell stack, the first end plate covering the front surface of the battery cell stack;
    a second space part defined between an upper surface of the frame and the edge surfaces of the battery cells positioned along the upper surface of the battery cell stack;
    a third space part defined between a lower surface of the frame and the edge surfaces of the battery cells positioned along the lower surface of the battery cell stack; and
    a fourth space part defined between a second one of the end plates and the edge surfaces of the battery cells positioned along the rear surface of the battery cell stack, the second end plate covering the rear surface of the battery cell stack.

3. The battery module of claim 2, wherein the first space part is defined by a space positioned between the first end plate and the edge surfaces of at least two adjacent ones of the plurality of battery cells, and wherein the fourth space part is defined by a space positioned between the second end plate and the edge surfaces of at least two adjacent ones of the plurality of battery cells.

4. The battery module of claim 2, wherein the second space part is defined by a space positioned between the frame and the edge surfaces of at least two adjacent ones of the plurality of battery cells, and wherein the third space part is defined by a space positioned between the frame and the edge surfaces of at least two adjacent ones of the plurality of battery cells.

5. The battery module of claim 2, wherein the plurality of space parts are configured such that the insulating oil flows from the first space part of the battery cell stack to either the second space part or the third space part, after which the insulating oil flows to the fourth space part.

6. The battery module of claim 2, wherein the supply inlet being positioned at an upper end of the first end plate, and the discharge outlet being positioned at a lower end of the second end plate.

7. The battery module of claim 2, wherein the electrode leads are formed so as to protrude from both ends of the battery cells to the first and fourth space parts, respectively, to make direct contact with the insulating oil flowing in the first and fourth space parts.

8. The battery module of claim 1, wherein the end plates and the frame are coupled to each other by an adhesive agent that seals an interior of the battery module containing the plurality of space parts that receive the insulating oil.

9. The battery module of claim 1, further comprising:
busbar frames formed between the end plates and the battery cell stack, wherein the busbar frames communicate with the space parts such that the busbar frames make direct contact with the insulating oil.

10. A battery pack comprising the battery module of claim 1.

* * * * *